J. A. WOTTON.
SYSTEM FOR CHARGING SECONDARY BATTERIES.
APPLICATION FILED AUG. 6, 1912.
1,059,255.
Patented Apr. 15, 1913.
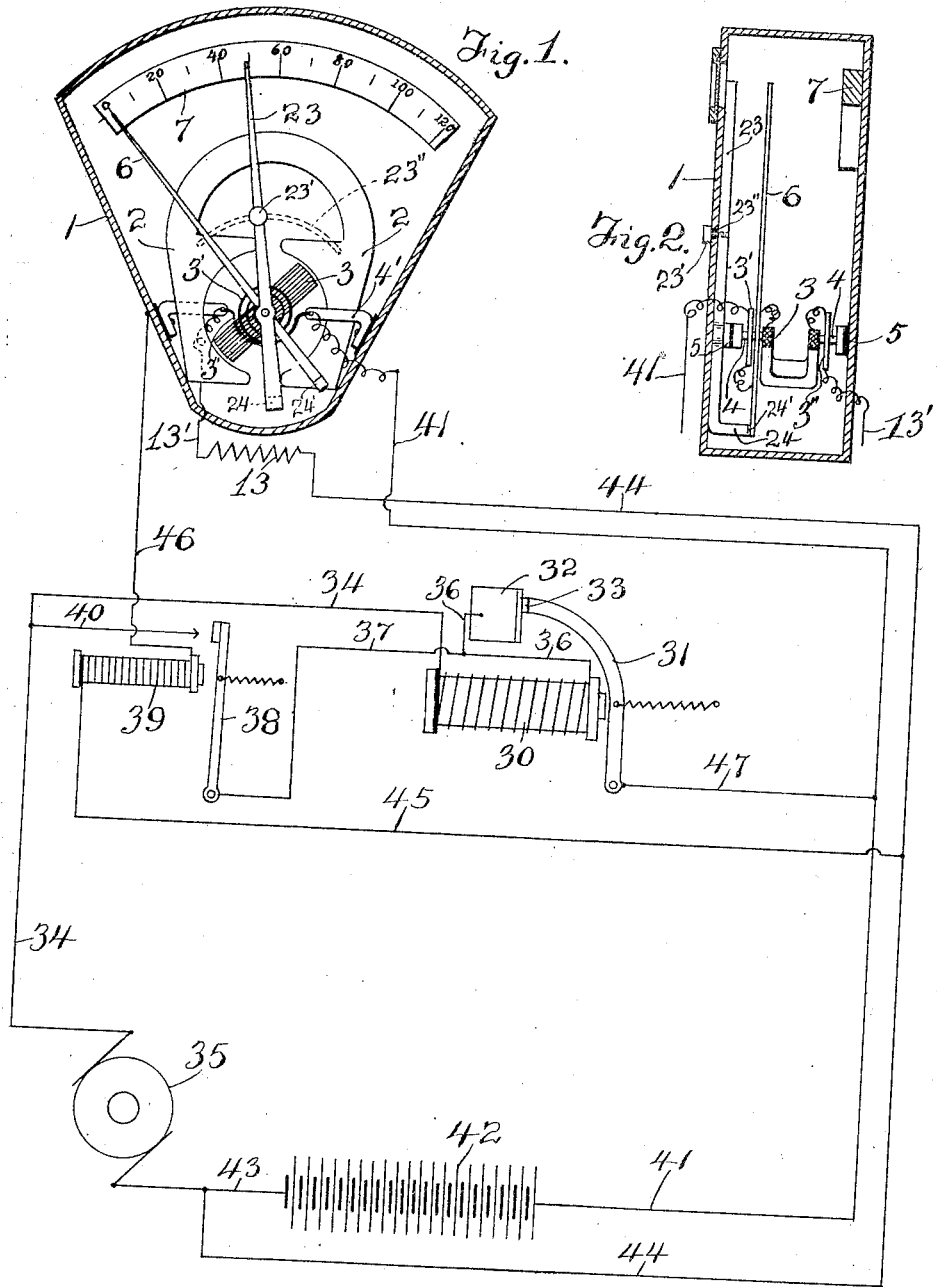

UNITED STATES PATENT OFFICE.

JAMES A. WOTTON, OF MONTCLAIR, NEW JERSEY, ASSIGNOR TO ELECTRIC PRODUCTS CO., OF CLEVELAND, OHIO, A CORPORATION OF GEORGIA.

SYSTEM FOR CHARGING SECONDARY BATTERIES.

1,059,255. Specification of Letters Patent. Patented Apr. 15, 1913.

Original application filed May 6, 1909, Serial No. 494,265. Divided and this application filed August 6, 1912. Serial No. 713,615.

*To all whom it may concern:*

Be it known that I, JAMES A. WOTTON, a citizen of the United States, residing at Montclair, in the county of Essex and State of New Jersey, have invented certain new and useful Improvements in Systems for Charging Secondary Batteries; and I do hereby declare the following to be a full, clear, and exact description of the invention, such as will enable others skilled in the art to which it appertains to make and use the same.

This invention relates to improvements in systems for charging secondary batteries, adapted for automatically controlling the supply of charging current, and the system is particularly designed for use in a direct current circuit.

This is a division of my co-pending application Serial No. 494,265, filed May 6, 1909, for improvements in systems for charging secondary batteries, the subject matter herein being directed specifically to direct current systems, while the genus and that species comprehending alternating current systems are presented in said co-pending application.

In the accompanying drawing,—Figure 1 is a diagrammatical view of a system embodying the features of the present invention, the meter casing being indicated in section, and the operating parts in elevation. Fig. 2 is a vertical, central section through the meter.

Referring to the drawing by numerals, 1 indicates a casing of the volt meter, and 2 the field magnets thereof. The armature 3 is mounted on pivots 4, suitably insulated, as at 5, 5, from the casing. Secured to the armature 3 is the index pointer 6, the upper or longer end of which moves relative to the graduated scale 7 for indicating voltage, the armature being wound in the manner of an ordinary volt meter. An outer spring 3′, of the flat spiral type, is fixed at one end to the upper pivot 4, and at the other end is suitably connected as to a bracket 4′ fixed to and insulated from the casing 1. Spring 3′ is tensioned to press the pointer 6 toward the zero point of the scale 7, and the said spring is electrically connected with the pointer, but insulated from casing 1. Pointer 6 is in turn electrically connected with one end of the winding of armature 3, and the other end of said winding is similarly connected to an inner spring 3″, similar in construction and arrangement to spring 3′. Spring 3″ is connected with the resistance 13 of the meter by conductor 13′. A conductor 47 is connected to spring 3″ and extends thence to one side of battery 42 which is made up of the secondary cells to be charged. The other side of the battery 42 is connected to conductor 43 which extends to a source of current 35, a direct current dynamo for instance. A branch conductor 44 leads from conductor 43 to the end of resistance 13 opposite that connected to conductor 13′, whereby the meter 1 is subject to the current of battery 42 and adapted to be influenced by the voltage of said battery.

A pointer 23 is pivoted within casing 1 to swing on the same axis as pointer 6, and has its upper end extending above scale 7 similarly to pointer 6. The pointers 6 and 23 both extend below their pivots, and pointer 23 is formed with an inwardly turned finger 24 adapted to at times have its inner end contact with a contact block 24′ formed on the lower end of pointer 6. The front face of casing 1 is formed with an arcuate slot 23″ struck from the axis of the pointers as a center. A set screw 23′ extends loosely through the slot 23″ and has a threaded engagement with pointer 23. The head of the set screw is outside the casing and of larger diameter than the width of the slot 23′, whereby, in operation, the set screw may be loosened and the pointer 23 moved manually across the face of the scale 7 to the required extent. It is understood that the discharge voltage of a secondary cell is approximately two volts, and the battery voltage will therefore represent the product of the number of cells in the battery times two. The voltage of a cell on reaching a fully charged condition ranges from 2.50 to 2.55, and therefore if the battery 42 is made up of twenty cells, the maximum voltage when fully charged will be approximately fifty. Therefore, the operator, in practice, will position the pointer 23 at fifty volts when he has twenty cells in his battery to be charged, and will then tighten the set screw 23 for retaining the pointer in the adjusted position. Thus, the pointer 23 will always be adjusted relative to the number of cells to be charged before beginning the charging operation.

A conductor 34 leads from the opposite side of dynamo 35 from the conductor 43 and has electrical communications through controlling apparatus hereinafter described with conductor 41 for supplying the charging current from the dynamo to the battery. Said controlling apparatus includes an electro-magnet 30, armature 31, and contact block 32, said armature having a contact point 33. Point 33 and block 32 are of a size and material such as carbon not to be injured by sparking, though the spark occurring at this point is inconsiderable. Armature 31 may be spring actuated in a direction from the magnet or may be gravity operated as preferred. One end of the winding of magnet 30 is connected by conductor 34 with the source of current supply 35. The other end of said winding is connected by conductor 36 to block 32, said conductor 36 being branched, as at 37, to the armature 38 of an electro-magnet 39. A branch 40 of conductor 34 is adapted at times to be closed in circuit with armature 38 when magnet 39 is energized.

Conductor 44 is branched, as at 45, leading to one end of the winding of magnet 39, the other end of said winding being grounded on the casing of the meter, as by conductor 46. Conductor 41 is branched, as at 47, leading to the armature 31.

When the battery 42 is introduced into the charging circuit and the current turned on, contact 33 being in contact with block 32, having been moved manually or otherwise into such contact, the charging circuit will be as follows: from generator 35, through conductor 34, through winding of magnet 30, through conductor 36, block 32, contact 33, armature 31, and conductors 47 and 41 to battery, and from battery to generator through conductor 43. The volt meter 1, of course, responds to the battery voltage by reason of the battery circuit as follows: conductor 41, to spring 3' and pointer 6 to winding of armature 3, to spring 3'', to resistance 13, and conductor 44, to conductor 43 and battery. The pointer 23 having been set at the desired maximum voltage of the battery, the charging current continues to flow until the battery voltage rises sufficiently for bringing the pointers into substantial parallelism, whereupon the contacting of contact members 26 and 27 will divert the battery current as follows: from battery through conductor 41, to spring 3', to pointer 6, to pointer 23, to the casing of volt meter 1, to conductor 46 to the winding of magnet 39, said winding being of low resistance relative to the resistance 13, and through branch conductor 45, to conductor 44 and conductor 43 back to battery. Current in this circuit actuates armature 38 and thus short circuits the generator current from magnet 30 as follows: from generator 35, through conductor 34, to branch conductor 40, through armature 38, to branch conductor 37, directly to conductor 36, to block 32, through contact 33, to armature 31, to conductors 47 and 41, to battery, to conductor 43, back to the generator. This short circuiting eliminating the magnet 30, allows the armature 31 to be drawn or fall away from the magnet and thus break contact between elements 32 and 33.

What I claim is:

1. In a system of the class described, the combination with a charging circuit, and a battery to be charged interposed in said circuit, of a meter, a battery circuit for the meter for influencing the meter by battery current, a circuit breaker interposed in the charging circuit, an electro-magnet interposed in said charging circuit and disposed for retaining the circuit breaker closed during excitation of the charging circuit, a normally broken shunt across the electro-magnet for the charging circuit adapted when closed to cut out the electro-magnet, an electro-magnet having its armature interposed in the shunt and adapted to close the shunt when the last mentioned electro-magnet is energized, and a circuit for the last mentioned electro-magnet adapted to be closed by the meter under the influence of the battery circuit.

2. In a system of the class described, the combination with a charging circuit, a meter connected to be influenced relative to conditions of the charging circuit, a circuit breaker interposed in the charging circuit, an electro-magnet controlling said circuit breaker when energized, said electro-magnet being connected to be energized by the charging circuit, a shunt across the magnet adapted to remain normally open and to deënergized the magnet when closed, and means controlled by the meter for closing said shunt.

3. In a system of the class described, the combination with a circuit breaker controlling means therefor, battery charging circuit including said breaker and said controlling means, a branch circuit adapted for short circuiting said controlling means, an electro-magnet for closing the branch circuit, and battery voltage actuated means for energizing said magnet.

4. In a system of the class described, the combination of a battery charging circuit, a circuit breaker interposed therein, having an electro-magnet whose winding is also interposed in said circuit for retaining said circuit closed during charging operation, a branch circuit short circuited about said magnet, an armature interposed in said branch circuit, an electro-magnet for actuating said armature, and battery circuit controlled means for energizing said magnet.

5. In a system of the class described, the combination with a charging circuit, a circuit breaker interposed therein, an electro-magnet for maintaining said circuit breaker closed during the charging operation, the winding of said magnet being interposed in the charging circuit, a branch circuit adapted for short circuiting the winding of said electro-magnet, an armature interposed in said branch circuit and adapted to normally maintain the same open, an electro-magnet for actuating said armature for closing the branch circuit, a battery circuit for said electro-magnet, and battery voltage controlled means for closing said branch circuit.

6. In a system of the class described, the combination with a charging circuit, of a circuit breaker therefor, an electro-magnet for actuating said circuit breaker, a normally open circuit for said electro-magnet, a movable contact, battery current influenced means for actuating the movable contact, and an adjustable contact in the path of movement of the movable contact and adapted to be engaged thereby for closing the magnet circuit.

In testimony whereof I affix my signature in presence of two witnesses.

JAMES A. WOTTON.

Witnesses:
W. F. HOFFMAN,
MURRAY V. CONATY